Dec. 17, 1929.  W. SETTERLUND  1,739,656
SAW SET
Filed March 12, 1928
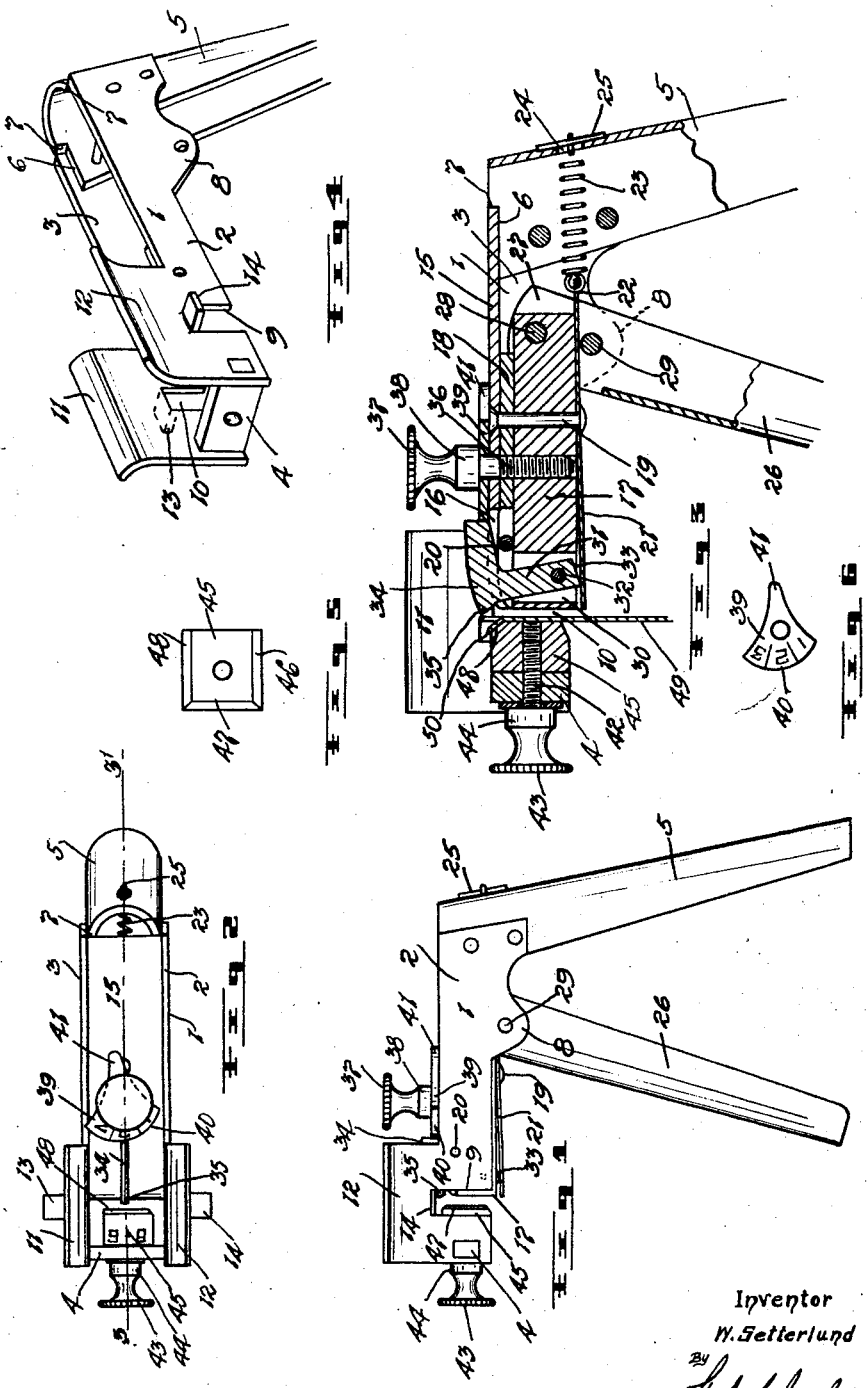
Inventor
W. Setterlund Patented Dec. 17, 1929

1,739,656

UNITED STATES PATENT OFFICE

WILHELM SETTERLUND, OF WINNIPEG, MANITOBA, CANADA

SAW SET

Application filed March 12, 1928. Serial No. 261,043.

The invention relates to improvements in saw sets and an object of the invention is to provide a saw set which with reasonable care can be used by the average individual to effectively set the teeth of any saw whether large or small.

A further object is to provide a tool which when once set for a particular saw to be sharpened will give all the teeth the same pitch or set.

A further object is to provide a tool which can be easily and accurately set to give a greater or less pitch of the tooth and which is arranged such that the work is done by the squeezing together of the tool handles provided.

A further object is to construct the tool in a simple, durable and inexpensive manner and so that the various parts can be readily assembled or dismounted and such that the various settings can be easily made.

With the above more important objects in view, the invention consists essentially in the arrangement and construction of parts hereinafter more particularly described, reference being had to the accompanying drawing, in which:—

Fig. 1 is a side view of the tool.

Fig. 2 is a plan view thereof.

Fig. 3 is an enlarged detailed vertical sectional view at 3—3' Figure 2.

Fig. 4 is a perspective view of the frame of the tool.

Fig. 5 is a face view of the adjustable block.

Fig. 6 is a plan view of the cam.

In the drawing like characters of reference indicate corresponding parts in the several figures.

The frame 1 of the tool comprises two similar spaced side plates 2 and 3 having their forward ends spaced by a cross bar 4 permanently riveted to the side plates and the rear ends permanently fastened by rivets to the upper end of the stationary handle 5. This handle extends downwardly at a slight angle and is substantially U-shaped in horizontal cross section and has the upper end cut away to provide opposing horizontal guides 6 and stop shoulders 7 at the ends of the guides. In advance of the handle, the plates are provided with opposing lugs 8 which carry a cross pin later described.

At the end remote from the handle, the plates are supplied with a pair of opposing vertical slots 9 and 10 above which are out curving flange like extensions 11 and 12 which serve to reinforce the plates at such points. At the upper ends of the slots, I locate two outstanding guide wings 13 and 14 against which the teeth of the saw to be sharpened rest.

A substantially rectangular top plate 15 is mounted slidably between the side plates and has the forward end thereof curved downwardly and centrally vertically slotted as indicated at 16. Inwardly from the plate, I locate a square bar 17 of predetermined length, the bar being spaced from the plate by a spacing strip 18 and being fastened to the plate by a rivet 19 passing through the bar, the spacing strip and the plate. The bar is considerably shorter than the plate although it is longer than the spacing strip. The top plate, bar and spacing strip being permanently fastened together, form what I term a shifting member slidably mounted in the frame.

The rear end of the top plate rests slidably on the guides 6 whilst the forward end is slidably carried by a cross pin 20 extending between the plates 1 and 2 and passing between the top plate and the bar 17 directly in advance of the spacing strip 18. The rivet 19 also fastens a flat spring 21 to the shiftable member and the rear end of the spring is extended beyond the rear end of the bar and is provided with an eye 22 to which I attach a coiled spring 23 which has the rear end thereof passed through a suitable opening 24 provided in the handle 5 and fastened from withdrawal by an exterior vertical pin 25. This spring 23 acts to pull the shiftable member rearwardly and its rear position is limited by the engagement of the rear end of the plate 15 with the shoulders 7.

A movable handle 26 also substantially U-shaped in horizontal cross section is provided and the upper end of the handle terminates in opposing lugs 27 which are received within the frame and span the rear end of the bar 17 to which they are pivotally connected by a cross pin 28. The latter handle is also pivotally connected to the frame by a cross pin 29 carried by the lugs 8. From the above arrangement, it will be obvious that one can advance the shifting member by grasping the handles between the fingers and thumb and closing the movable handle towards the stationary one.

The forward end of the bar 17 is provided with a vertical slot 30 and in this slot, I locate an arm 31 pivotally fastened to the bar by a cross pin 32. The lower end of the arm terminates in an inclined face 33 which engages the forward end of the spring 21 and the inclination of the face 33 is such that the spring continuously tends to swing the upper end of the arm 31 rearwardly. The upper end of the arm carries a head 34 which is received slidably within the slot 16 and has the forward end thereof formed to provide a setting tooth 35 which is fully exposed above the forward downwardly curving end of the plate 15.

The shiftable member carries an adjusting screw 36 provided at the upper end with a finger grip 37 and a shoulder 38. A cam 39 is rotatably mounted on the screw 36 between the shoulder 38 and the plate 15, the cam having the face 40 thereof eccentric to the screw. Suitable numbers are placed on the cam to indicate setting positions. The cam is provided with an extending lever 41 permitting of the ready setting of the same. The rear end of the head 34 rests continuously against the eccentric face 40 of the cam being held against it by the spring 21. Obviously by setting the cam, one can advance or withdraw the tooth 35 and accordingly control the set of the saw tooth engaged by the same. In the rear position of the shiftable member, the tooth 35 takes approximately a position slightly to the rear of the vertical plane passing transversely and centrally through the slots 9 and 10 and it will be observed that the tooth 35 under all working conditions will be in advance of the forward end of the shiftable member.

A fastening screw 42 passes centrally through the cross bar 4 and has the outer end provided with a finger grip 43 to the inner side of which is a shoulder 44. A block 45 is screw threaded on the inner end of the screw 42, the block being to the inner side of the cross bar 4. The block is herein shown as having three inclining faces 46, 47 and 48, these faces having different inclinations and being adapted to coact with the tooth 35 to set the saw tooth inserted therebetween. The several faces of the block have numbers thereon indicating the number of saw teeth to the inch and obviously one can set the block to present the desired face 46, 47 or 48 by releasing the screw 42, turning the block and then firmly tightening up the said latter screw.

When it is desired to set the teeth of the saw 49, the blade of the saw 49 is inserted in the slots 9 and 10 between the forward end of the shifting member and the block and at this time, the teeth of the saw are engaged with the guide wings 13 and 14. One of course knows the number of teeth to the inch of the saw and he sets the block and the cam plate accordingly. Having set the latter parts, he then squeezes the handles together and this causes the tooth 35 to advance towards the block and effects the bending and consequent proper setting of the saw tooth placed between the tooth 35 and the block. In Figure 3, the tooth 50 has been set. Having set this tooth, one then shifts the saw to bring the alternate teeth successively into setting position. After the alternate teeth have been all set, the saw is withdrawn and reversed and the remaining teeth are then successively set.

What I claim as my invention is:—

1. A saw set comprising a frame provided with a stationary handle, a movable handle opposing the stationary handle and pivotally attached to the frame, a shiftable member slidably mounted in the frame for endwise movement and actuated by the movable handle, a setting tooth projecting beyond the forward end of the shiftable membed and pivotally carried thereby, means carried by the shiftable member for advancing and withdrawing the tooth and an adjustable block carried by the front end of the frame and presenting a plurality of inclined faces of varying pitch, said frame being provided with opposing slots permitting of the insertion of a saw blade with a tooth thereof in the area between the setting tooth and one of the inclined faces of the block.

2. A saw set comprising a frame provided with a stationary handle, a movable handle opposing the stationary handle and pivotally attached to the frame, a shiftable member slidably mounted in the frame for endwise movement and actuated by the movable handle, a vertically disposed arm pivotally carried centrally at the forward end of the shiftable member, said arm having the upper end thereof terminating in a horizontally disposed head provided at the forward end with a setting tooth, said tooth normally projecting beyond the forward end of the shiftable member, means carried by the shiftable member for advancing and withdrawing the tooth, a block within and adjustably carried by the forward end of the frame and presenting a plurality of inclined faces of varying inclination, one or other of said faces being adapted to take a position opposing the tooth in the adjustment of the block and said frame being provided with opposing side slots permitting of the entrance of a saw blade with a tooth thereof positioned between the setting tooth and the opposing inclined face of the block.

3. A saw set comprising a frame having a stationary handle extending downwardly from the rear end thereof, a shiftable member mounted within and slidably carried by the frame and having a vertical slot in the forward end thereof, a movable lever pivotally connected rearwardly to the frame and to the rear end of the shiftable member, a spring holding the shiftable member normally withdrawn towards the rear end of the frame, a vertically disposed arm pivotally mounted within the slot and having the lower end thereof presenting an inclined face exposed beyond the lower end of the slot, a pressure spring fastened to the shiftable member and engaging the lower end of the arm, a lengthwise extending head carried by the upper end of the arm and having the forward end thereof formed to provide a setting tooth normally extending beyond the forward end of the frame, a cam plate pivotally mounted on the shiftable member and having an eccentric face engaging the rear end of the head, an adjusting screw passing through the forward end of the frame, a block within the frame and adjustably carried by the screw, said block presenting a plurality of inclined faces of different pitch which can be brought in the adjustment of the block selectively into a position opposing the setting tooth, said frame being provided forwardly with opposing vertical slots permitting of the insertion of a saw blade with a tooth thereof interposed between the setting tooth and the opposing inclined face of the block.

Signed at Winnipeg, this 21st day of February, 1928.

WILHELM SETTERLUND.